Jan. 16, 1973   R. L. HAWLEY   3,711,304
ROLL CENTERING METHOD AND APPARATUS
Original Filed July 12, 1968   5 Sheets-Sheet 1

INVENTOR
ROBERT L. HAWLEY
BY
Lawrence J. Hurst
ATTORNEY

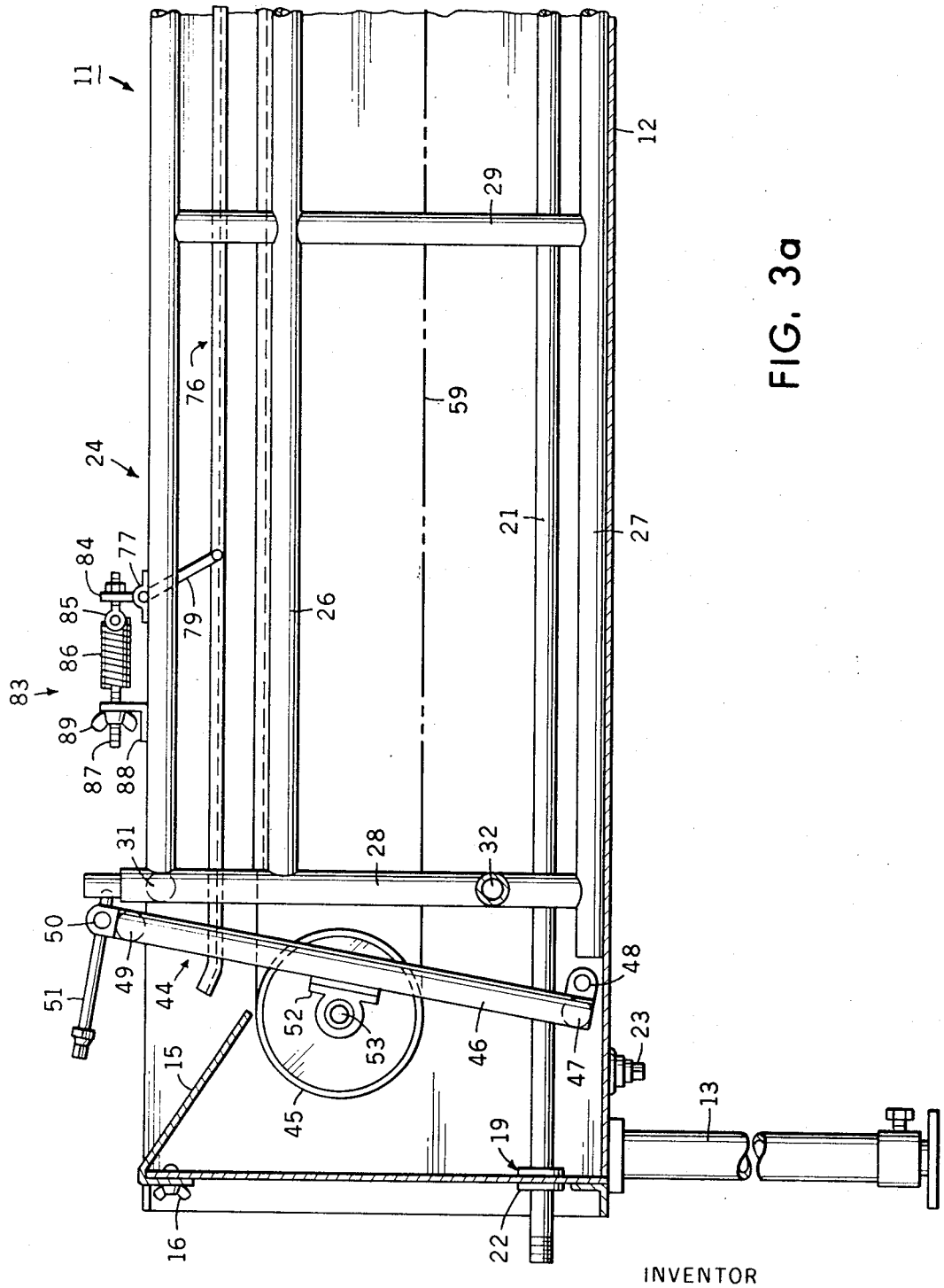

INVENTOR
ROBERT L. HAWLEY
BY
Lawrence J. Hurst
ATTORNEY

INVENTOR
ROBERT L. HAWLEY
BY
*Lawrence J. Harst*
ATTORNEY

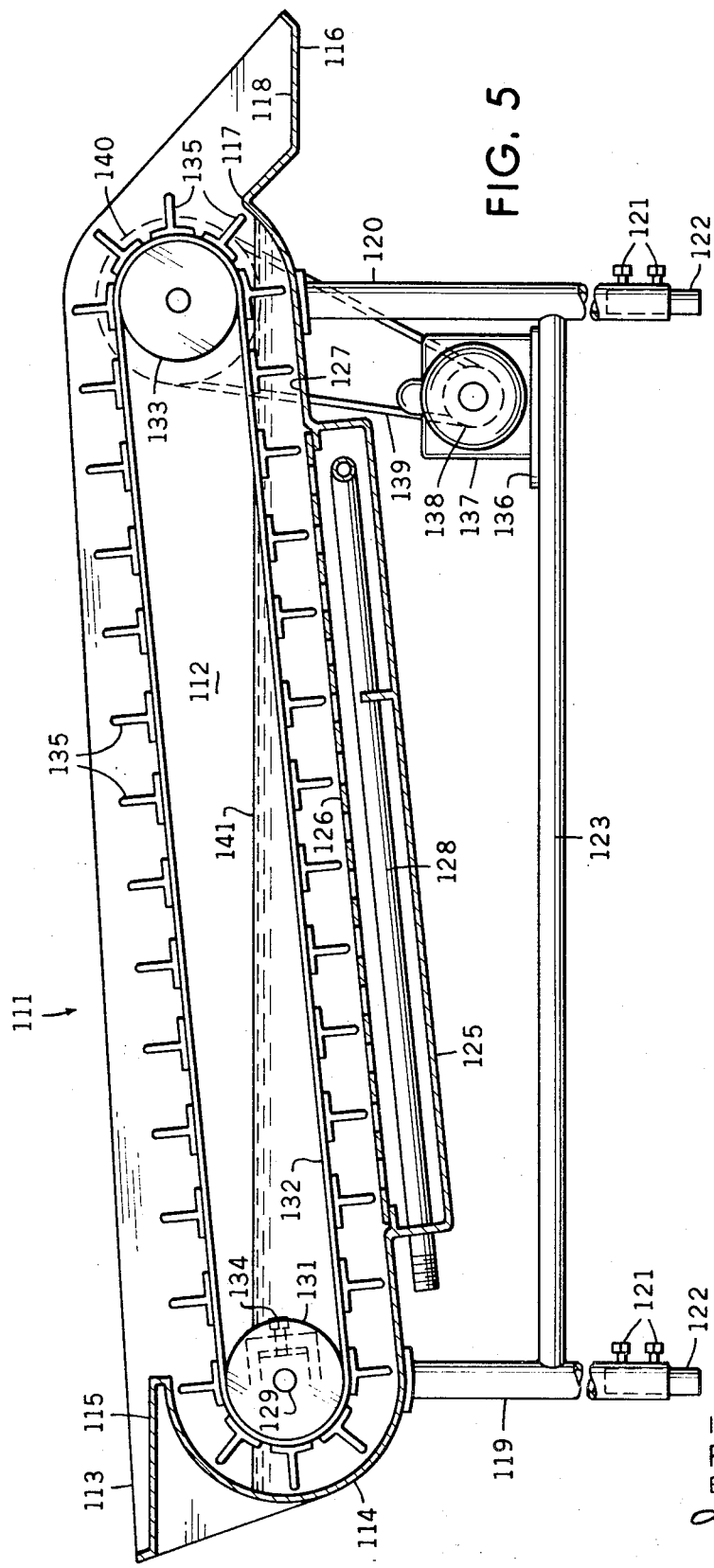

United States Patent Office 3,711,304
Patented Jan. 16, 1973

---

3,711,304
ROLL CENTERING METHOD AND APPARATUS
Robert L. Hawley, St. Louis, Mo., assignor to Ralston Purina Company, St. Louis, Mo.
Original application July 12, 1968, Ser. No. 744,571. Divided and this application Apr. 9, 1970, Ser. No. 27,046
Int. Cl. A23l *3/02*
U.S. Cl. 99—360
5 Claims

ABSTRACT OF THE DISCLOSURE

A container having a solid yolk body and liquid albumen therein is subjected to rotation while being heated whereby the albumen is coagulated concentrically in the container about the yolk body to form an egg roll product. One of the machines disclosed for carrying out the above method has contact members which rotate the containers in a heated bath. The container may also be subjected to the above method in a continuous operation by providing a machine having a continuous conveyor in close proximity to a contact surface. The container is moved through a heated bath in the machine by the conveyor while the container is in rolling contact with the contact surface whereby the rolling or rotational motion is imparted to the container as it is heated.

BACKGROUND OF THE INVENTION

This application is a divisional application of application Ser. No. 744,571, filed July 12, 1968, now abandoned, entitled "Roll Centering Method and Apparatus."

This invention relates to a method of manufacturing an egg product and, more particularly, to a method of manufacturing a cooked egg roll product with the yolk centered therein.

In the manufacture of an egg roll product it is desirable to have the yolk portion centered in the albumen portion. In the past, to achieve this finalized product in its desired form, it was necessary that the yolk portion be fixedly positioned before the albumen portion was formed around the yolk portion. One of these prior art attempts to manufacture this desired product required the holding of the yolk portion in the center of a casing by means of pins. This casing would later be filled with albumen which was coagulated and cooked about the yolk. This pinning operation to insure that the yolk portion was centralized was undesirable since it required an additional manual operation which increased the cost of producing such an egg product. Other prior art attempts to insure that the yolk portion would be centralized in the albumen have required the use of an interior sleeve or mold. The liquid albumen would be coagulated into its desired shape and then the interior mold would be removed and the liquid yolk would be supplied to the interior area. However, this was undesirable since it required the burden of removing the interior mold before the yolk portion could be placed in the egg roll. It was also undesirable because the albumen portion was subjected to an additional heating or cooking operation to coagulate the yolk portion which was placed in the interior of the previously coagulated albumen portion.

In accordance with this invention, it is possible to overcome these manual operations and still insure that the yolk portion of the egg roll will be centralized in the albumen. This invention makes it possible to achieve this desired result by subjecting the egg roll to a rotational force as the albumen is being coagulated which serves to remove the yolk portion to the center of the coagulating albumen.

SUMMARY OF THE INVENTION

It is, therefore, the general object of the present invention to provide a method for producing an egg roll product which includes a simplified manner of centralizing the yolk portion in the albumen of the egg roll.

Another object of the present invention is to provide a method having a single operation for substantially centralizing the yolk portion of an egg roll within the albumen while cooking the egg roll.

Briefly, the present invention comprises the method of producing an egg roll having the steps of placing an egg yolk body and liquid albumen into a container, and heating and rotating said container so that the albumen coagulates substantially concentrically in the container about the yolk body which is moved toward the center thereof.

Another aspect of the present invention is to provide a machine capable of carrying out the rotational and heating operation on a container having an egg roll product therein in a continuous flow operation.

These and other objects and advantages will become apparent hereinafter.

BRIEF DESCRIPTION OF THE DRAWINGS

In the drawings which illustrate embodiments of the present invention,

FIG. 3a is a cross-sectional view of the inlet end of a machine embodying the present invention for continuously centering the yolk portion of an egg roll, FIG. 5 is a cross-sectional view of another embodiment of a machine embodying the present invention.

DESCRIPTION OF THE PREFERRED EMBODIMENTS

Figure 1:
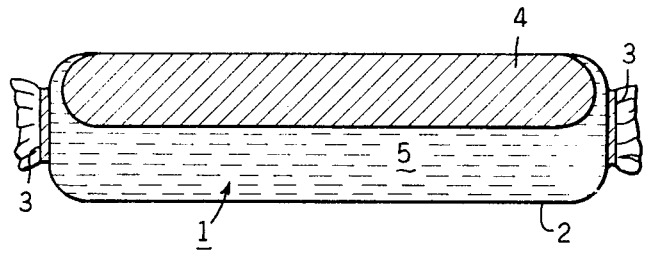
FIG. 1 is an enlarged cross-sectional view of the liquid albumen and yolk body in the container prior to the cooking operation.

Referring now to FIG. 1, an egg roll product, indicated generally at 1, is provided in a container or casing 2 which may be closed at the ends by suitable means such as retainer wires 3. One of the retainer wires 3 is affixed to the container 2 and thereafter a solid body 4, such as a in the casing or container 2. The container 2 is then filled with liquid heat coagulable albumen, such as protein, starch or egg albumen 5, before the other retainer wire 3 is secured in place. Since the egg yolk body 4 has a lower density than the liquid albumen 5, it will float to the top of the container 2, when said container is positioned as shown in FIG. 1. The casing 2, egg yolk body 4, and liquid egg albumen 5 form a unit which can be processed by the present invention.

Figure 2:
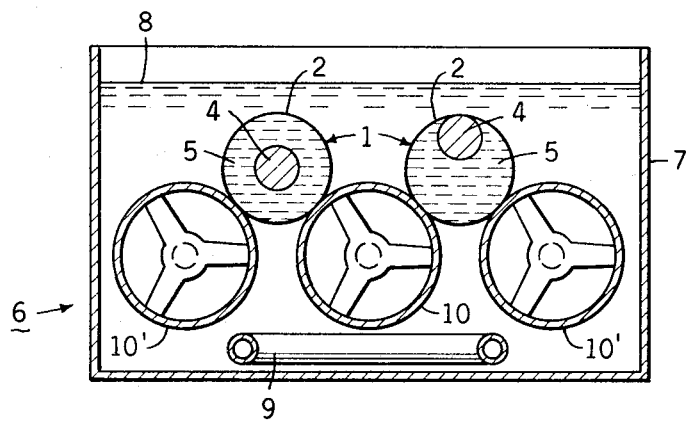
FIG. 2 is a cross-sectional view of a machine which may be used in carrying out the present invention.

Referring now to FIG. 2, a machine, indicated generally at 6, is shown for carrying out the present invention. The machine 6 is provided with a tank 7 which contains a suitable heating medium 8 which may be a liquid, such as water. A single-loop pipe 9 which serves as a heating medium is between 160° F. and 210° F., pref- may contain an electrical resistance element, or may serve as a steam coil, connected to a convenient source of heat (not shown). The heating element 9 serves to maintain the temperature of the heating medium at the desired value. A series of rollers or drums 10 and 10' are rotatably mounted in tank 7. Drum 10 is rotated by an external energy source, such as a motor, (not shown), while drums 10' may be idlers. In the operation of the machine 6, the egg roll units 1 are placed on the rollers 10, 10' and the heating medium 8 contacts the outer surface of the casings 2. The driven drum 10 is rotated imparting a rotating force to the egg rolls 1 and since the idler drums 10' are free to rotate the egg rolls 1 are subjected to a rotational movement. The rotational speed of the roller 10 is controlled, by a gear reducer, motor, or other suitable means (not shown), to produce rotation of the egg rolls 1 at a rate sufficient to free the egg yolk body 4 from the casing 2 so that the albumen 5 will coagulate substantially concentrically about the yolk body 4. A rotation of the egg roll 1 of approximately three to four revolutions per minute is satisfactory. As the egg rolls 1 rotate, heat is transferred from the heating medium 8 through the casing 2 and the albumen 5 nearest the casing 2 is heated to a coagulating temperature. As the heating is continued, the albumen 5 coagulates progressively from a point adjacent the casing 2 to the center of the egg roll 1. The rotation of the egg roll 1 and the progressive coagulating of the albumen 5 drives the egg yolk body 4 toward the center of the egg roll so that on completion of the heating and rotating steps the albumen 5 has coagulated substantially concentrically in the casing 2 and the egg yolk body 4 is located substantially at the center of the egg roll 1. The temperature of the heating medium 8 and the time of exposure of the egg rolls 1 are controlled by thermostats, timers, or other suitable means (not shown) to produce the desired degree of coagulation of the albumen. A satisfactory temperature for the heating medium is between 160° F. and 210° F., preferably between 180° F. and 200° F. The egg rolls should be exposed to the heating medium while being rotated for a sufficient time to effect the coagulation of the albumen which for an egg roll having an outer diameter of approximately 1¾" and a yolk diameter of approximately 1 inch is approximately in the range of ½ to 6 minutes. A time of about 2 minutes is preferable. Thereafter, the egg roll should be subjected to a final cooking operation to totally coagulate the albumen, which total cooking time is approximately 15–25 minutes. This final cooking operation may be carried out either by continuing to apply heat to the egg roll, as it is being rotated or by heating the egg roll in a static condition after the initial rolling operation. The time of cooking and the temperature of the egg roll should be carefully regulated to avoid a green coloration appearing at the interface between the egg yolk body and the albumen. The longer the egg roll is heated after the albumen is substantially coagulated, the greater the incidence of green coloration will be. The temperature of the albumen should be in the range of 148° F. to 200° F. on completion of the heating step. A temperature of between 160° F. and 180° F. is preferred.

Figure 3B:
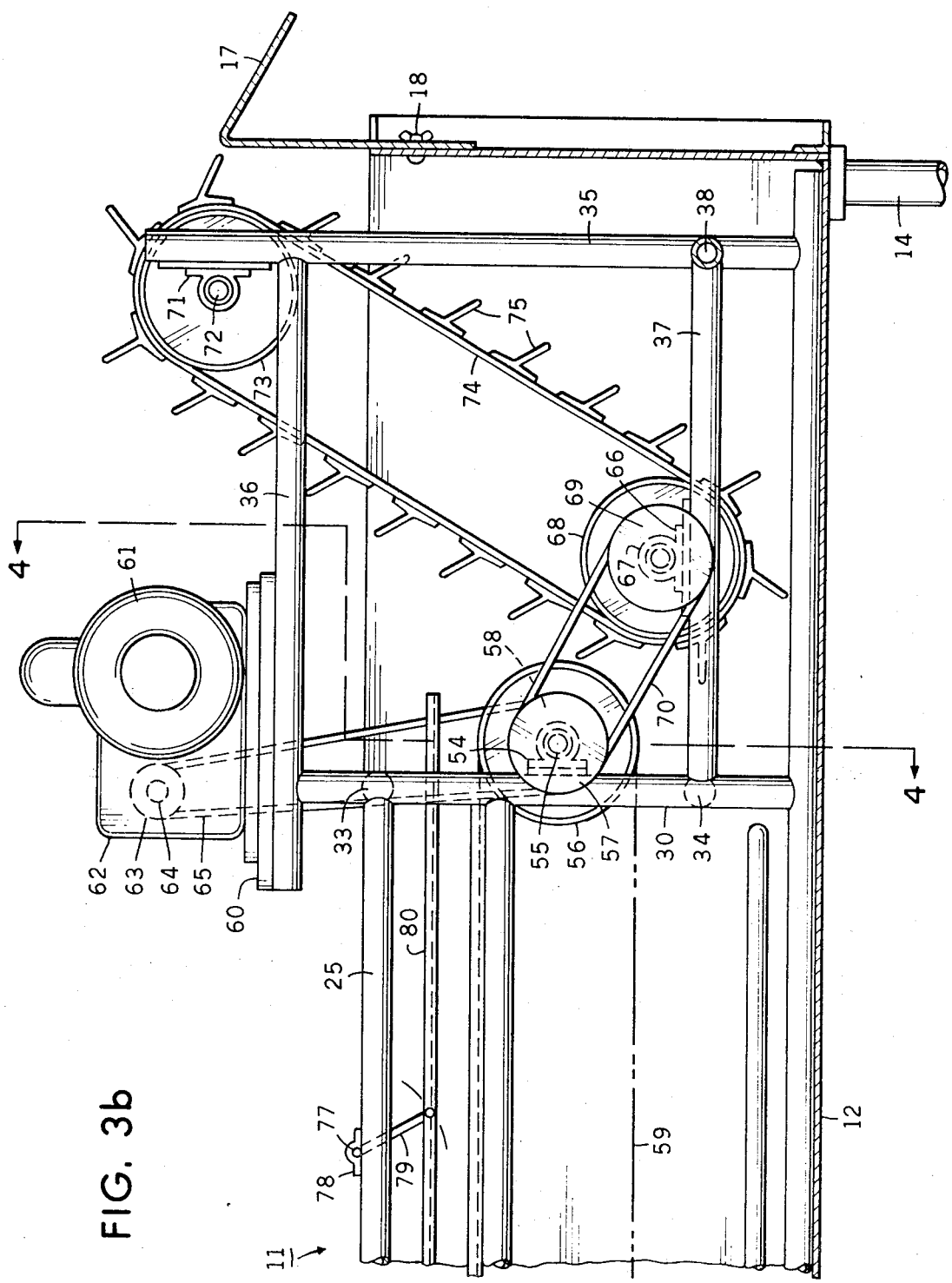
FIG. 3b is a cross-sectional view of the discharge end of the machine of FIG. 3a, FIG. 4 is a sectional view of the machine of FIG. 2b taken along line IV—IV of FIG. 3b.
Figure 4:
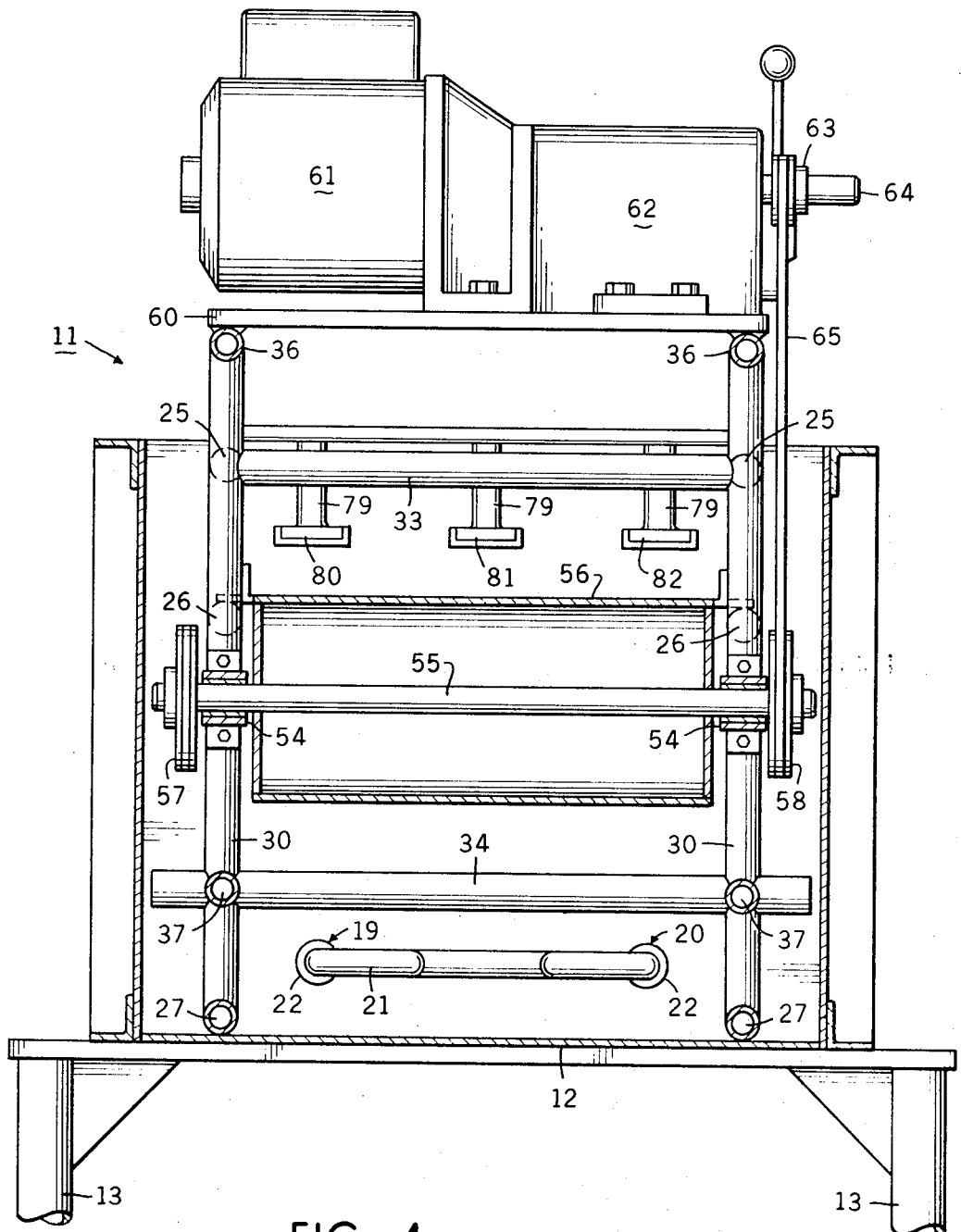

Referring now to FIG. 3a and FIG. 3b, an egg roll machine indicated generally at 11 for carrying out the method of the present invention is shown. The machine comprises an elongated rectangular tank 12 having a pair of legs 13 and 14 at the opposed ends thereof. The leftward or inlet end of the tank 12 is provided with a downwardly sloping feed tray 15 which is attached to the tank 12 by suitable means such as wing nuts 16. The rightward or outlet end of the tank 12 is provided with a discharge chute 17 which is connected to the tank 12 by suitable means such as wing nuts 18. A pair of apertures 19 and 20 are provided in the lower portion of the leftward end of the tank 12 for receiving a heating element pipe indicated generally at 21. The apertures 19 and 20 are provided with suitable sealing means 22 such that a fluid tight seal is formed between the heating element 21 and the side of tank 12. The pipe 21 is adapted for connection to a suitable heat supply source (not shown) such as a steam source so that a heating medium may be circulated through the pipe 21 and tank 12. Tank 12 is also provided with a drain 23 so that the water in tank 12 may be drained therefrom.

A frame unit indicated generally at 24 is provided in the interior of tank 12. The frame unit consists of pairs of longitudinally extending pipes or rods 25, 26 and 27 which are connected to a plurality of pairs of vertically extending pipes or rods 28, 29 and 30, respectively. The pipes 28 are connected by means of cross members or braces 31, 32 and the pipes 30 are connected by means of cross members or braces 33, 34. With respect to the right end of the frame unit 24, it should be noted that the pair of longitudinally extending members 27 extend beyond the vertical mmebers 30 and are connected to another pair of vertical rods or pipes 35. Another pair of longitudinally extending members 36 are provided between the vertical members 30 and 35, respectively and the members 36 are provided about longitudinal members 25. Further, it should be noted that an additional pair of longitudinal brace members 37 is provided between the vertically extending members 30 and 35, respectively. To complete the description of the frame unit 24, it should be noted that the cross member 38 is provided between the vertical members 35 such that the longitudinal members and vertical extending members serve to form an integral unit with a very rigid construction.

A mounting frame indicated generally at 44 is connected to the leftward end of the frame unit 24 for supporting a conveyor belt drum indicated generally at 45. The mounting unit 44 consists of a pair of rods 46, which connect at the lower portion thereof with cross member 47 and said rods and cross member are connected by suitable means such as cotter pins 48 to the leftward end of the longitudinal members 26. The upper ends of the members 46 are connected by a cross member 49 and are provided with threaded openings 50 for connection to the vertical member 28, by means of bolts 51. Thus it is possible to move the mounting member 44 toward or away from the vertical member 28, by means of movement of the bolts 51. A pair of brackets 52 are welded to the mid portion of the bars 46, and are provided with a shaft 53 therein for mounting the conveyor belt drum 45 thereon. Another pair of mounting brackets 54 are provided on the vertical mounting members 30, by suitable means such as welds and said mounting brackets have therein a shaft 55. Shaft 55 is provided with a conveyor belt drum 56 and also has thereon a pair of pulleys 57 and 58. An endless conveyor belt indicated at 59 is provided for passage around the conveyor drums 45 and 56 and it should be noted that since the mounting member 44 is adjustable, it is possible to maintain the proper amount of tension on the belt 59 so that it will not slip on the conveyor drums 45 and 56.

A motor mount plate 60 is provided on the longitudinal extending members 36 by suitable means such as welds for supporting the motor 61 and a gear reduction unit 62. A pulley 63 is provided on the shaft 64 which extends from the gear reduction unit 62. Belt 65 is provided for passage around pulley 63 and around pulley 57 for effecting the driving motion of the drum 56 and thereby the belt 59.

A pair of mounting brackets 66 is provided on the longitudinal extending members 41 by suitable means such as welds and said mounting brackets have a shaft 67 therein. Shaft 67 has mounted thereon a conveyor belt drum 68 and a pulley 69. A belt 70 is provided for passage around pulley 69 and also passes around the pulley 58 such that movement of shaft 55 is effective to establish movement of shaft 67. Another pair of mounting brackets 71 is provided on the vertically extending members 35 by suitable means such as welds and a shaft 72 is provided in said mounting brackets. A conveyor belt drum 73 is provided on the shaft 72 and has a belt 74 which passes around it and drum 68. Belt 74 is provided with a plurality of radially extending fingers or arms 75 which pass in close proximity to belt 59 as it follows its path around drum 56. The fingers 75 also pass in close proximity to the rightward end of the tank 12 and the discharge chute 17 so that items contained in the compartments between said radially extending fingers may be discharged onto said chute.

It should be noted that the feed tray 15 extends to a point slightly above the conveyor belt 59 such that the egg roll containers fed to the machine 11 may roll down said feed tray to the conveyor 59 for subsequent conveyance through tank 12. A contact bar assembly indicated generally at 76 is provided above the conveyor 59 and it extends longitudinally parallel to the path of said conveyor from the conveyor drum 45 to the conveyor drum 56. The contact assembly 76 comprises a pair of shafts 77 which extend transversely to the longitudinal members 25 and which are mounted on said members by means of mounting brackets 78. A plurality of arms or bars 79 have one end thereof connected to each of the shafts 77 and the other ends thereof have connected thereto the longitudinally extending angle iron or contact members 80, 81 and 82. An adjustment mechanism 83 is connected to the leftward shaft 77 to move the contact members 80, 81 and 82 toward and away from the conveyor 59 such that said contact members may be predeterminately spaced from the conveyor 59 for accommodating various sized containers therebetween The adjustment mechanism 83 comprises a lever which is connected to the shaft 77 and extends vertically above the longitudinal members 25. An eyebolt member 85 is provided to extend through the lever member 84 and it is fixedly positioned therein by means of spring 86. The eye portion of the bolt 85 is connected to one end of spring 86 and the other end of the spring is connected to a threaded shaft 87. The threaded shaft 87 extends through a mounting bracket 88 which is connected to the longitudinally extending members 25 by suitable means such as welds. The free end of the threaded shaft extending through the mounting bracket 88 has threaded thereon a wing nut or adjustment bolt 89. When the wing nut 89 is moved rightwardly on the shaft 87 the spring 86 serves to pull the lever 84 leftwardly thereby pivoting the shaft 77 and the arm 79 in a counterclockwise direction to raise the contact members 80, 81 and 82 toward a position an increased distance from the conveyor 59. Correspondingly, should the wing nut 89 be moved leftwardly on the shaft 87, the tension on the spring 86 is relaxed enabling the lever 84 and the shaft 77 and rods 79 to move in a clockwise direction thereby serving to enable the contact members 80, 81 and 82 to move to a position more closely positioned to the conveyor belt 59. In this manner, it is possible to adjust the positioning of the contact members 80, 81 and 82 with respect to the conveyor belt 59 such that the containers may be conveyed therebetween and engaged by said contact members to whatever degree desired.

In the operation of the machine 11, liquid is supplied to the tank 12 to a level just above the contact members 80, 81 and 82 and is heated to approximately 160° F.– 210° F. by the heating element 21. The gear reducer 62 is adjusted to rotate the shaft 64 and the pulley 63 whereby the pulley 57 and pulley 58 are effective to move the conveyor 59 and conveyor 74 in a clockwise direction. Containers 2 having liquid albumen 5 and an egg yolk body 4 therein, as previously described, are placed on the feed tray 15. The containers 2 then roll onto the conveyor 59 between said conveyor and the contact members 80, 81 and 82. Thereafter, due to the frictional drag of the conveyor 59 on the egg roll container the container is urged rightwardly through the body of liquid in the tank 12. The contact members 80, 81 and 82 are adjusted so that they assert a slight pressure on the container when it is positioned on the conveyor 59. (The method of adjusting the contact members with respect to the conveyor 59 having been previously discussed with respect to the construction of the machine 11.) Therefore, as the container is moved rightwardly by the conveyor 59, it is engaged between contact members 80, 81 and 82 which serves to impart a rolling or rotating motion to said containers as they are moved by the conveyor. It will be appreciated that the rate of rotation of the containers will be affected by the speed of the conveyor 59 and this speed should be estabilshed so that the albumen will coagulate substantially concentrically in the container. A conveyor speed of about twelve feet per minute is satisfactory. Also, the length of time that the container is maintained in this rolling or rotating condition beneath the level of the heated liquid in the tank 12 will be sufficient to enable a complete coagulation of the albumen about the yolk body.

As the container is moved by the conveyor 59 and the rotating motion imparted thereto, the albumen begins to coagulate from the container wall inwardly so that the albumen coagulates in a concentric manner thereby urging the yolk body substantially to the center thereof as the coagulation occurs. The length of time for the coagulation to occur will be dependent upon the size of egg roll being processed. However, it has been found that for an egg roll of approximately 1¾ inches diameter with a yolk portion of approximately 1 inch diameter the initial coagulation will occur between ½ minute and 6 minutes and preferably in about 2 minutes as the container 2 is moved through the liquid bath at a temperature between 160° F.–210° F. and preferably at a temperature of 170° F. Thereafter, the egg roll should be subjected to a final cooking operation to totally coagulate the albumen. The total cooking time should be between approximately 15–25 minutes and the final cooking operation may be carried out either by continuing to rotate the egg roll as it is heated or by heating the egg roll in a static condition after the initial rolling operation which centers the yolk body in the albumen.

After the albumen 5 has coagulated concentrically about the yolk body 4, the container 2 is carried by the conveyor 59 about the conveyor drum 56 whereby said containers fall into the compartments formed by the arm members 75 on the conveyor 74. The containers are carried by the conveyor 74 about the conveyor drum 73 and are then discharged therefrom onto the chute 17 for subsequent handling. The machine 11 may be designed to effect the total cooking of the albumen or only to effect the initial coagulation of the albumen and this will be dependent on the operator's requirements.

Figure 6:
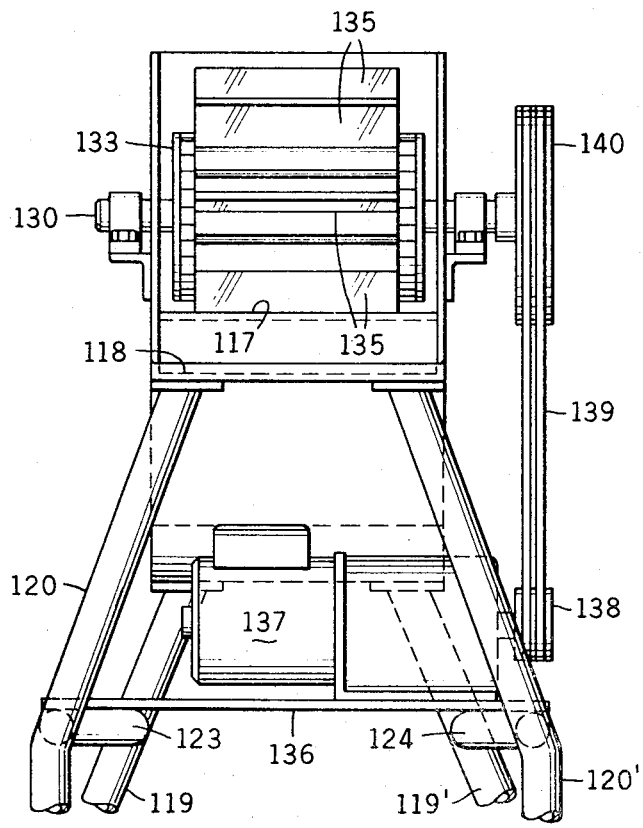
FIG. 6 is an end view of the machine of FIG. 5.

Referring now to FIGS. 5 and 6, another embodiment of a continuous egg roll centering and cooking machine is indicated generally at 111. The machine 111 is provided with a tank 112 for containing a heat treating bath. The tank 112 has a generally rectangular cross-sectional contour which is open at the top. The leftward or inlet end 113 (as viewed in FIG. 5) of the tank 112 is provided with a cylindrical cross-sectional portion 114. The cylindrical cross-sectional portion 114 defines approximately one-half of a cylinder, and the upper point of the portion 114 connects with a feed tray 115. The rightward or discharge end 116 of the tank 112 is provided with an inwardly turned lip portion 117 which then tapers downwardly to a discharge plate or tray 118. A pair of tubular legs 119, 119' are provided on the tank 112 adjacent to the inlet end 113 and another pair of tubular legs 120, 120' are provided on said tank adjacent to the discharge end 116.

Each of the tubular legs 119, 119' and 120, 120' are provided with suitable means such as screws 121 for fixed attachment to the solid mounting plugs 122 inserted into said tubular legs. A cross brace or support member 123 is provided between the legs 119 and 120, and another cross brace or support member 124 is provided between the legs 119' and 120'. Thus the legs and cross braces form an integral unit for supporting the tank 112. It should be noted that the tubular legs 120, 120' are predeterminately longer than the tubular legs 119, 119' such that the tank 112 is provided with an upward incline from the inlet end 113 toward the outlet end 116 thereof. A recessed portion 125 is provided in the bottom of the tank body 112 between the legs 119, 119' and 120, 120'. A removable slotted plate 126 is adapted for placement over the recessed portion 125 such that a continuous inclined surface 127 is defined by the bottom wall of the tank 112 and the plate 126 from the inlet end 113 toward the outlet end 116 thereof. A pipe indicated generally at 128 is provided in the recessed portion 125. The pipe 128 forms a single loop through the recessed portion 125 and is adapted for connection to a source of heat, (not shown) such as steam, to supply heat to the bath in the tank 112. In this manner it is possible to maintain the liquid bath in the tank 112 at a predetermined temperature.

A shaft 129 is journalled in the opposed sides of the tank 112 adjacent to the inlet end 113 and another shaft 130 is journalled in the opposite sides of said tank adjacent to the outlet end 116 thereof. It should be noted that the shafts 129 and 130 are provided at a predetermined distance from the inclined surface 127 of the tank 112. A pulley or sprocket indicated generally at 131 is provided on the shaft 129 and extends substantially the entire length of the shaft 129. Only a small amount of clearance is provided between the ends of the pulley 131 and the side walls of the tank 112 such that a solid base or support is provided for a flexible conveyor belt 132. The conveyor 132 passes around the pulley 131 and also around another pulley indicated generally at 133 provided on the shaft 130. The pulley 133 is similar in construction to the pulley 131 such that the continuous conveyor belt 132 has a continuous path of travel around the pulleys 131, 133. An adjustment mechanism indicated generally at 134 is provided for adjusting the position of the pulley 131 to exert a predetermined amount of tension on the continuous belt 132 which minimizes the slippage of said belt on the pulleys 131 and 133. The belt 132 is provided with a plurality of radially extending fingers or arms 135 which are positioned to pass in close proximity to the surface of the cylindrical cross-section 114 of the tank 112 and the inclined surface 127 of said tank. In addition, it should be noted that the radially extending fingers 135 are longitudinally spaced apart a predetermined distance sufficient to accommodate a container holding an egg roll product. A motor mount indicated generally at 136 is fixedly attached to the tubular leg 120' and the cross brace 124. A motor 137 is provided on the support bracket 136 and the shaft of the motor 137 has a pulley 138 thereon. A belt 139 passes around the pulley 138 and around a pulley 140 on the shaft 130 such that the rotation of the shaft 138 serves to rotate the shaft 130 and effect movement of the conveyor 132.

In the operation of the machine 111, water is supplied to the tank 112 to a level indicated generally at 141 which is just below the apex of the lip portion 117. Heat is supplied through the pipe 128 which serves to heat the water in the tank 112 to a temperature of approximately 160°–210° F. and preferably about 190° F. Motor 137 is effective to rotate the shaft 130 and pulley 133 which rotates conveyor 132 in a counter clockwise direction as viewed in FIG. 5. The containers 2 having the egg roll product therein are fed along the tray 115 where they fall into the spaces provided between the radially extending fingers 135 on the belt 132. The containers are carried around the pulley member 131 into the heated water where coagulation of the albumen 5 begins. As the containers 2 pass from the cylindrical cross-section 114 onto the inclined surface 127, the movement of the conveyor 132 and the effect of the fingers 135 tend to impart a rotation or rotating effect to said containers. As the containers are moved up the inclined surface the friction between the containers and inclined surface 127 causes the containers to roll along said surface such that the albumen is gradually coagulated from the exterior of the container towards the interior thereof. As previously discussed, this coagulation of the albumen plus the rotational force of the container serves to urge the yolk body toward the center of the container such that the albumen coagulates concentrically about the yolk body. The length of time which it takes for the container to move from the inlet end 113 to the discharge end 116 is selected such that complete coagulation of the albumen is effected and when the container is discharged over the lip portion 117 and onto the tray 118 an egg roll having the egg yolk portion substantially centered in the albumen portion is attained. It should be understood that the machine 111 may be designed such that the egg roll is maintained therein to carry out only the initial coagulation of the albumen or to carry out the total cooking of the albumen, as previously discussed.

From the foregoing, it is apparent that a novel process is substantially centralizing the yolk body in the albumen portion of an egg roll product and the equipment to be utilized in carrying out such a process meeting the objectives set out hereinbefore has been disclosed and that changes or modifications as to the process and/or the equipment set forth in the disclosure by way of illustration may be made by those skilled in the art without departing from the spirit of the invention as defined by the claims which follow.

What is claimed is:

1. Apparatus for continuously substantially centralizing the yolk portion in the albumen portion of an egg roll product comprising a tank adapted to contain a bath of heated liquid; said tank having an inlet and an outlet; a continuous conveyor in said tank between said inlet and outlet for moving containers having the egg roll product therein from said inlet to said outlet; contact bars in said tank spaced a predetermined distance from a portion of said conveyor, said containers being received between said contact bars and the portion of said conveyor, said contact bars and said conveyor establishing contact with said containers as they are moved by said conveyor through said bath of heated liquid to impart a rolling motion thereto permitting coagulation of the albumen substantially concentrically about the yolk as the container is moved from the inlet to the outlet.

2. The apparatus according to claim 1 wherein said contact bars are adjustable, and adjustment means connected to said contact bars for controlling the spacing between the portion of said conveyor and said contact bars to receive said containers therebetween.

3. Apparatus for continuously substantially centralizing the yolk portion in the albumen portion of an egg roll product comprising a tank adapted to contain a bath of heated liquid, said tank having an inlet at one end thereof and an outlet at the other end thereof; said inlet being adapted to receive containers having an egg yolk body and liquid albumen therein, an endles belt conveyor in said tank for moving said containers from said inlet to said outlet through the bath of heated liquid, a contact bar extending in close proximity to a portion of said conveyor and spaced a predetermined distance therefrom, said containers being received between said contact bar and the portion of said conveyor, said contact bar and said conveyor establishing contact with said containers as they are moved by said conveyor from said inlet to said outlet end while being in rolling contact with said contact means to impart a rolling motion to the container permitting coagulation of the albumen substantially concentrically about the yolk as the container is moved from the inlet to the outlet, and discharge means in the outlet end of said tank for removing said containers therefrom.

4. The apparatus according to claim 3 including adjustment means on said contact bar for controlling the predetermined spacing of said contact bar to said endless conveyor for adjusting the engagement of said contact bar with said container.

5. The apparatus according to claim 3 wherein said discharge means comprises a conveyor in the tank at the outlet end thereof, said conveyor having a plurality of arms thereon to form compartments for receiving the containers from between said endless conveyor and said contact bar, and a discharge chute on the outlet end of said tank for receiving the containers discharged from the compartments of said conveyor.

References Cited

UNITED STATES PATENTS

| | | | |
|---|---|---|---|
| 2,249,792 | 7/1941 | Skinner | 99—404 UX |
| 2,319,561 | 5/1943 | Scharsch | 99—404 |
| 2,811,914 | 11/1957 | Chironis | 99—404 X |
| 3,331,375 | 7/1967 | Hickey et al. | 99—404 X |
| 3,493,393 | 2/1970 | Shires | 99—113 |
| 1,710,357 | 4/1929 | Grunwald | 15—3.15 X |
| 2,412,565 | 12/1946 | Davis | 15—3.15 |
| 2,415,782 | 2/1947 | Zademach et al. | 259—54 |
| 2,450,033 | 9/1948 | Cohen | 107—4 B |
| 2,717,548 | 9/1955 | Blair | 99—360 |
| 2,881,715 | 4/1959 | Heim | 107—9 F |
| 2,910,992 | 11/1959 | Wilcox | 198—160 X |
| 3,160,263 | 12/1964 | Lewis | 198—160 X |
| 3,418,918 | 12/1968 | Beauvais et al. | 99—364 X |

R. W. JENKINS, Primary Examiner
A. O. HENDERSON, Assistant Examiner

U.S. Cl. X.R.

99—404, 443 C